United States Patent
Saiki et al.

(10) Patent No.: US 11,391,191 B2
(45) Date of Patent: Jul. 19, 2022

(54) REDUCTANT INJECTING DEVICE, EXHAUST GAS PROCESSING DEVICE AND EXHAUST GAS PROCESSING METHOD

(71) Applicant: NGK INSULATORS, LTD., Nagoya (JP)

(72) Inventors: Katsumi Saiki, Nagoya (JP); Yukinari Shibagaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/301,621

(22) Filed: Apr. 9, 2021

(65) Prior Publication Data

US 2021/0222603 A1    Jul. 22, 2021

Related U.S. Application Data

(63) Continuation of application No. PCT/JP2019/034276, filed on Aug. 30, 2019.

(30) Foreign Application Priority Data

Dec. 6, 2018   (JP) .............................. JP2018-229475

(51) Int. Cl.
   *F01N 3/20*   (2006.01)
   *F01N 3/28*   (2006.01)
(52) U.S. Cl.
   CPC ......... *F01N 3/2073* (2013.01); *F01N 3/2013* (2013.01); *F01N 3/2066* (2013.01);
   (Continued)
(58) Field of Classification Search
   CPC .... F01N 3/2073; F01N 3/2013; F01N 3/2066; F01N 3/2828; F01N 3/2892;
   (Continued)

(56) References Cited

U.S. PATENT DOCUMENTS

| 2012/0045378 | A1  | 2/2012 | Soukhojak et al. |
| 2014/0047821 | A1* | 2/2014 | Kawada ................ F01N 3/2066 60/299 |

(Continued)

FOREIGN PATENT DOCUMENTS

| CN | 103068733 A | 4/2013 |
| JP | 2007-327377 A1 | 12/2007 |

(Continued)

OTHER PUBLICATIONS

English translation of the International Preliminary Report on Patentability (Chapter I) dated Jun. 17, 2021 (Application No. PCT/JP2019/034276).

(Continued)

*Primary Examiner* — Brandon D Lee
(74) *Attorney, Agent, or Firm* — Burr & Brown, PLLC (57) ABSTRACT

A reductant injecting device includes: a honeycomb structure comprising: a pillar shaped honeycomb structure portion having a partition wall that defines a plurality of cells each extending from a fluid inflow end face to a fluid outflow end face; and at least one pair of electrode portions arranged on a side surface of the honeycomb structure portion; an outer cylinder being configured to house the honeycomb structure, the outer cylinder having a carrier gas introduction port on the fluid inflow end face side; a urea sprayer arranged at one end of the outer cylinder; a carrier gas introduction cylinder provided at the carrier gas introduction port of the outer cylinder; and a carrier gas flow rate amplifier provided in the carrier gas introduction cylinder.

9 Claims, 7 Drawing Sheets

(52) U.S. Cl.
CPC ......... *F01N 3/2828* (2013.01); *F01N 3/2892* (2013.01); *F01N 2240/40* (2013.01); *F01N 2330/06* (2013.01); *F01N 2330/30* (2013.01); *F01N 2610/02* (2013.01); *F01N 2610/08* (2013.01); *F01N 2610/1453* (2013.01)

(58) Field of Classification Search
CPC ............. F01N 2240/40; F01N 2330/06; F01N 2330/30; F01N 2610/02; F01N 2610/08; F01N 2610/1453; F01N 3/027; F01N 2240/16; F01N 2240/25; F01N 2610/10; F01N 3/2026; B01D 53/94
See application file for complete search history.

(56) References Cited

U.S. PATENT DOCUMENTS

| | | | |
|---|---|---|---|
| 2014/0096532 | A1 | 4/2014 | Broderick et al. |
| 2016/0017777 | A1 | 1/2016 | Kasai et al. |
| 2017/0241318 | A1 | 8/2017 | Kasai et al. |
| 2017/0284256 | A1 | 10/2017 | Ishihara et al. |
| 2017/0284257 | A1* | 10/2017 | Omiya ................. B01D 53/944 |
| 2017/0284258 | A1* | 10/2017 | Saiki ..................... F01N 3/2066 |

FOREIGN PATENT DOCUMENTS

| | | |
|---|---|---|
| JP | 2009-250218 A1 | 10/2009 |
| JP | 2012-197695 A1 | 10/2012 |
| JP | 2017-180298 A1 | 10/2017 |
| JP | 2017-180299 A1 | 10/2017 |
| WO | 2014/148506 A1 | 9/2014 |

OTHER PUBLICATIONS

International Search Report and Written Opinion (Application No. PCT/JP2019/034276) dated Nov. 19, 2019.

Chinese Office Action, Chinese Application No. 201980067499.9, dated May 25, 2022 (7 pages).

* cited by examiner

FIG. 7

REDUCTANT INJECTING DEVICE, EXHAUST GAS PROCESSING DEVICE AND EXHAUST GAS PROCESSING METHOD

FIELD OF THE INVENTION

The present invention relates to a reductant injecting device, an exhaust gas processing device, and an exhaust gas processing method.

BACKGROUND OF THE INVENTION

An exhaust gas processing device using a selective catalytic reduction NOx catalyst (SCR catalyst) is known for purifying nitrogen oxides (NOx) in exhaust gases discharged from various engines (Patent Literature 1).

The exhaust gas processing device described in Patent Literature 1 includes a catalyst (SCR catalyst) attached to an exhaust gas pipe of an engine and a means for injecting urea water into the exhaust gas pipe between the engine and the catalyst, and also includes a plurality of urea water injection means for mixing urea water with an exhaust gas, reacting with specific components in the exhaust gas by the catalyst, and mixing the urea water with the exhaust gas.

However, in the exhaust gas processing device described in Patent Literature 1, a temperature of the exhaust gas has to be 200° C. or more in order to decompose urea in the urea water into ammonia by the heat of the exhaust gas. Therefore, when the temperature of the exhaust gas is lower, there is a problem that the decomposition reaction of urea is difficult to take place, and an amount of ammonia required for the NOx treatment is insufficient.

Therefore, an exhaust gas processing device using a reductant injecting device has been proposed, wherein the reductant injecting device includes: a honeycomb structure (a honeycomb heater) having a cylindrical honeycomb structure portion and a pair of electrode portions arranged on a side surface of the honeycomb structure portion; and a urea sprayer being configured to spray an aqueous urea solution onto the honeycomb structure portion (Patent Literature 2). The reductant injecting device used in the exhaust gas processing device can spray the aqueous urea solution onto the honeycomb structure portion that has been electrically heated by applying a voltage to the electrode portions, and decompose the urea in the aqueous urea solution in the honeycomb structure to produce ammonia efficiently.

However, the spraying of the aqueous urea solution onto the honeycomb structure portion electrically heated decreases a temperature of a region where the aqueous urea solution is sprayed, thereby generating a temperature irregularity in the honeycomb structure portion. As a result, urea deposits (crystals caused by the urea) tend to be generated in a lower temperature region of the honeycomb structure portion. The generation of the urea deposits blocks a flow path in the honeycomb structure portion, which will inhibit the decomposition of the urea into ammonia.

Therefore, exhaust gas processing devices using a reductant injecting device provided with a carrier gas introduction port between the urea injector and the honeycomb structure have been proposed (Patent Literatures 3 and 4). According to the reductant injecting device used in each exhaust gas processing device, a carrier gas introduced from the carrier gas introduction port can facilitate the flow of the gas in the honeycomb structure portion. Therefore, even if the aqueous urea solution is sprayed onto the honeycomb structure portion, a temperature difference in the honeycomb structure portion can be decreased, thereby suppressing the generation of urea deposits.

CITATION LIST

Patent Literatures

[Patent Literature 1] Japanese Patent Application Publication No. 2007-327377 A
[Patent Literature 2] WO 2014/148506
[Patent Literature 3] Japanese Patent Application Publication No. 2017-180298 A
[Patent Literature 4] Japanese Patent Application Publication No. 2017-180299 A

SUMMARY OF THE INVENTION

The present invention relates to a reductant injecting device, comprising:
a honeycomb structure comprising:
a pillar shaped honeycomb structure portion having a partition wall that defines a plurality of cells each extending from a fluid inflow end face to a fluid outflow end face; and
at least one pair of electrode portions being configured to heat the honeycomb structure portion by conducting a current, the pair of the electrode portions being arranged on a side surface of the honeycomb structure portion, the honeycomb structure being configured to be able to decompose urea in an aqueous urea solution in the honeycomb structure portion heated by conducting the current to generate ammonia;
an outer cylinder being configured to house the honeycomb structure, the outer cylinder having a carrier gas introduction port being configured to introduce a carrier gas, on the fluid inflow end face side;
a urea sprayer being configured to spray the aqueous urea solution to the fluid inflow end face side of the honeycomb structure portion, the urea sprayer being arranged at one end of the outer cylinder;
a carrier gas introduction cylinder provided at the carrier gas introduction port of the outer cylinder; and
a carrier gas flow rate amplifier being configured to amplify a flow rate of the carrier gas, the carrier gas flow rate amplifier being provided in the carrier gas introduction cylinder.

Further, the present invention relates to an exhaust gas processing device, comprising:
an exhaust gas pipe through which an exhaust gas flows;
the reductant injecting device being configured to inject ammonia into the exhaust gas pipe; and
an SCR catalyst arranged at the exhaust cylinder on a downstream side of a position where the ammonia is injected.

Furthermore, the present invention relates to a method for processing an exhaust gas, the method comprising injecting generated ammonia into the exhaust gas by the reductant injecting device, and reducing the exhaust gas mixed with the ammonia by an SCR catalyst.

DETAILED DESCRIPTION OF THE INVENTION

For the reductant injecting devices described in Patent Literatures 3, it may be difficult to introduce the carrier gas into the reductant injecting device depending on types of carrier gases used and positions to be arranged. For example, when a gas (exhaust gas) from an engine exhaust system is used as the carrier gas, a pressure of the exhaust gas is decreased depending on the position where the reductant injecting device is arranged, so that it may be difficult to introduce the exhaust gas from an exhaust gas pipe into the reductant injecting device. In particular, if a pressure loss of the honeycomb structure is larger, the exhaust gas may not flow from the exhaust gas pipe into the reductant injecting device at all. A decreased amount of the carrier gas introduced into the reductant injecting device cannot sufficiently facilitate the flow of the gas in the honeycomb structure, so that urea deposits are easily generated.

The present invention has been made to solve the above problems. An object of the present invention is to provide a reductant injecting device, which can stably suppress urea deposits.

Also, a further object of the present invention is to provide an exhaust gas processing device and an exhaust gas processing method, which can stably inject a required amount of ammonia from the reductant injecting device to purify NOx.

As a result of intensive studies focusing on a method for introducing a carrier gas into a reductant injecting device, the present inventors have found that by using a carrier gas flow rate amplifier, the carrier gas can be stably introduced into the reductant injecting device regardless of types of carrier gases used, and they have completed the present invention.

According to the present invention, it is possible to provide a reductant injecting device, which can stably suppress urea deposits.

Also, according to the present invention, it is possible to provide an exhaust gas processing device and an exhaust gas processing method, which can stably inject a required amount of ammonia from the reductant injecting device to purify the NOx.

Hereinafter, preferable embodiments of a reductant injecting device, an exhaust gas processing device and a method for processing an exhaust gas according to the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention. For example, some components may be deleted from all components set forth in the embodiments, or components of different embodiments may be combined as appropriate.

Embodiment 1

(1) Reductant Injecting Device

Figure 1:
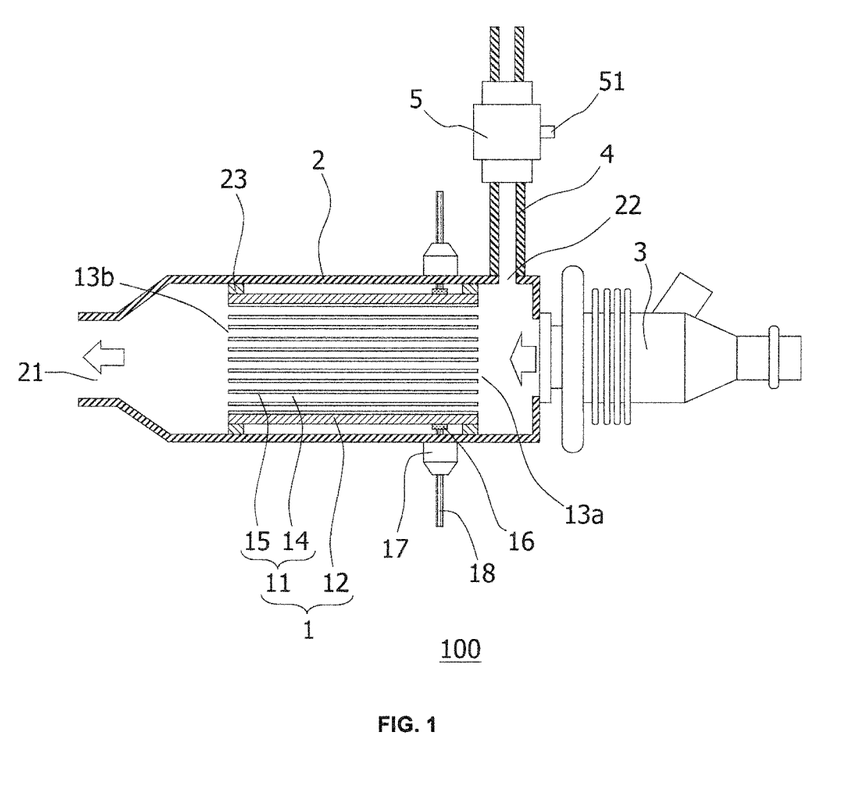
FIG. 1 is a schematic cross-sectional view showing a reductant injecting device according to Embodiment 1 of the present invention.

FIG. 1 is a schematic cross-sectional view showing a reductant injecting device according to Embodiment 1 of the present invention (a schematic cross-sectional view parallel to an extending direction of cells of a honeycomb structure portion).

As shown in FIG. 1, a reductant injecting device 100 according to the present embodiment includes: a honeycomb structure 1; an outer cylinder 2; a urea sprayer 3; a carrier gas introduction cylinder 4; and a carrier gas flow rate amplifier 5.

The honeycomb structure 1 includes: a pillar shaped honeycomb structure portion 11 having a partition wall 15 that defines a plurality of cells 14 extending from a fluid inflow end face 13a to a fluid outflow end face 13b; and at least one pair of electrode portions 12 being configured to heat the honeycomb structure portion 11 by conducting a current, the electrode portions 12 being arranged on a side surface of the honeycomb structure portion 11. The cells 14 of the honeycomb structure portion 11 form a flow path.

As used herein, the "fluid inflow end face 13a" means an end face having a fluid inflow port, and the "fluid outflow end face 13b" means an end face having a fluid outflow port. Further, as used herein, the "pair of electrode portions 12" means that one electrode portion 12 is arranged on an opposite side of the other electrode portion 12 across the center of the honeycomb structure portion 11, in a cross section orthogonal to the extending direction of the cells 14 of the honeycomb structure portion 11.

The electrode portion 12 is formed in a band shape along the extending direction of the cells 14. One pair of electrode portions 12 are preferred, but pairs of electrode portions 12 are possible in terms of increasing a heat generation efficiency of the honeycomb structure portion 11.

The outer cylinder 2 has an inlet side end portion and an outlet side end portion, and houses the honeycomb structure 1 therein. The inlet side end portion, which is one end, is provided with the urea sprayer 3, and the outlet side end, which is the other end, is provided with an injection port 21 for injecting ammonia. Further, the outer cylinder 2 has a carrier gas introduction port 22 being configured to introduce a carrier gas on the fluid inflow end face 13a side of the honeycomb structure portion 11, i.e., between the honeycomb structure 1 and the urea sprayer 3.

The honeycomb structure 1 housed in the outer cylinder 2 is fixed (held) in the outer cylinder 2 via an insulation holding portion 23. This can allow insulation between the honeycomb structure 1 and the outer cylinder 2 to be ensured. There may be a portion (space) where the insulation holding portion 23 is not arranged between the honeycomb structure 1 and the outer cylinder 2, but the entire outer circumference of the honeycomb structure 1 may be covered with the insulation holding portion 2. A material of the insulation holding portion 23 is not particularly limited as long as it has excellent insulating properties. For example, alumina may be used.

The urea sprayer 3 is arranged at one end (inlet side end portion) of the outer cylinder 2 and sprays an aqueous urea solution on the fluid inflow end face 13a side of the honeycomb structure portion 11. The aqueous urea solution is a raw material for ammonia produced by the reductant injecting device 100 according to the present embodiment.

The carrier gas introduction cylinder 4 is provided at the carrier gas introduction port 22 of the outer cylinder 2. The other end of the carrier gas introduction cylinder 4 is connected to a feed source of a carrier gas introduced into the carrier gas introduction cylinder 4.

Non-limiting examples of the carrier gas that can be used include exhaust gases, intake gases, and air from other air feeding devices (compressors and the like mounted on large vehicles and the like). The exhaust gas is preferred. In addition, when the intake gas (a gas from an engine intake system) is used as the carrier gas, it is preferable to preheat the intake gas by using a heating means or the like because a temperature of the intake gas is lower.

The carrier gas flow rate amplifier 5 has a function of amplifying a flow rate of the carrier gas, and is provided in the carrier gas introduction cylinder 4.

In the reductant injecting device 100 according to the present embodiment, which has the above structure, urea in the aqueous urea solution sprayed from the urea sprayer 3 is decomposed in the honeycomb structure portion 11 heated by conducting the current to generate ammonia (a reductant), and the ammonia is injected to the outside via the injection port 21. In this case, the introduction of the carrier gas into the fluid inflow end surface 13a side of the honeycomb structure portion 11 can create the flow of the gas from the fluid inflow end face 13a to the fluid outflow end face 13b side in the honeycomb structure portion 11. Further, depending on the types of carrier gases used, it may be difficult to introduce the carrier gas into the reductant injecting device 100. However, since the carrier gas flow rate amplifier 5 is provided in the carrier gas introduction cylinder 4, the carrier gas can be stably introduced into the reductant injecting device 100. Therefore, it is difficult for the heat and the aqueous urea solution to be stagnated in the honeycomb structure portion 11, whereby urea deposits can be stably suppressed.

Hereinafter, the reductant injecting device 100 according to the present embodiment will be described in detail for each component.

(1-1) Honeycomb Structure 1

The honeycomb structure 1 includes the honeycomb structure portion 11 and the electrode portions 12.

The partition wall 15 forming the honeycomb structure portion 11 may preferably be made of ceramics, although not particularly limited thereto. In particular, the partition wall 15 preferably contains a silicon-silicon carbide composite material or silicon carbide as a main component, and more preferably a silicon-silicon carbide composite material as a main component. The use of such a material can allow electrical resistivity of the honeycomb structure portion 11 to be easily adjusted to any value by changing a ratio of silicon carbide and silicon.

As used herein, the "silicon-silicon carbide composite material" as the main component means a material containing silicon carbide particles as an aggregate and metallic silicon as a binding material for binding silicon carbide particles. In the silicon-silicon carbide composite material, it is preferable that a plurality of silicon carbide particles are bonded by metallic silicon. Further, the "silicon carbide" as the main component means a material formed by sintering silicon carbide particles. Furthermore, as used herein, the "main component" means a component contained in an amount of 90% by mass or more.

The honeycomb structure portion 11 preferably has an electrical resistivity of from 0.01 to 500 Ωcm, and more preferably from 0.1 to 200 Ωcm, although not particularly limited thereto. The control of the electrical resistivity to such a level can effectively heating the honeycomb structure portion 11 by applying a voltage to at least one pair of electrode portions 12. More particularly, in order to heat the honeycomb structure portion 11 to 160 to 600° C. using a power source having a voltage of from 12 to 200 V, the electrical resistivity is preferably in the above range.

The electrical resistivity of the honeycomb structure portion 11 is a value at 25° C. The electrical resistivity of the honeycomb structure portion 11 is a value measured by a four-terminal method.

The honeycomb structure portion 11 preferably has a surface area per unit volume of from 5 $cm^2/cm^3$ or more, and more preferably from 8 to 45 $cm^2/cm^3$, and particularly preferably from 20 to 40 $cm^2/cm^3$. The surface area of 5 $cm^2/cm^3$ or more can allow a sufficient contact area with the aqueous urea solution to be ensure, thereby appropriately controlling a treatment rate of the aqueous urea solution, i.e., an amount of ammonia generated (a generation rate).

The surface area of the honeycomb structure portion 11 is an area of the surfaces of the partition wall 15 of the honeycomb structure portion 11.

The partition wall 15 of the honeycomb structure portion 11 preferably has a thickness of from 0.06 to 1.5 mm, and more preferably from 0.10 to 0.80 mm. The thickness of the partition wall 15 of 1.5 mm or less can reduce a pressure loss, thereby appropriately controlling the treatment rate of the aqueous urea solution, i.e., the amount of ammonia generated (generation rate). The thickness of the partition wall 15 of 0.06 mm or more can prevent the honeycomb structure portion 11 from being destroyed by a thermal shock caused by electric conduction heating.

Figure 2:
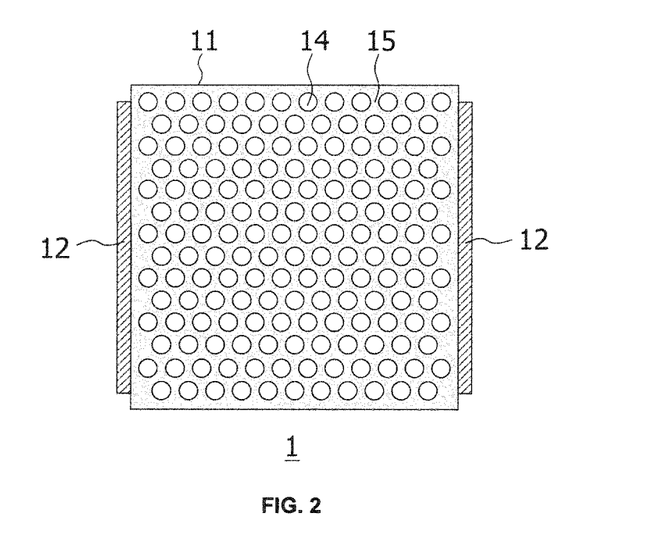
FIG. 2 is a schematic plan view showing a fluid inflow end face of a honeycomb structure forming a reductant injecting device according to Embodiment 1 of the present invention.

When the shape of each cell 14 (the shape of the cross section orthogonal to the extending direction of the cell 14) is circular as shown in FIG. 2, the thickness of the partition wall 15 means a thickness of a portion where "a distance between the cells 14 is the shortest (a portion where the thickness of the partition wall 15 is lower)".

The cells 14 preferably have a density of from 7 to 140 $cells/cm^2$, and more preferably from 15 to 120 $cells/cm^2$. The density of the cells 14 of 7 $cells/cm^2$ or more can allow a sufficient contact area with the aqueous urea solution to be ensured, thereby appropriately controlling the treatment rate of the urea aqueous solution, i.e., the amount of ammonia generated (generation rate). The density of the cells 14 of 140 $cells/cm^2$ or less can reduce the pressure loss, thereby appropriately controlling the treatment rate of the aqueous urea solution, i.e., the amount of ammonia generated (generation rate).

The honeycomb structure portion 11 may have some cells 14 provided with plugged portions at the end portion on the fluid inflow end surface 13a side. The material of the plugged portions is preferably the same as that of the partition wall 15, but other materials may be used.

A shape of the fluid inflow end face 13a may be various shapes such as a rectangle, or other polygons, a circle, and an ellipse in addition to the square shape as shown in FIG. 2. Further, the shape of the fluid inflow end surface 13a is the same as that of the fluid outflow end face 13b, and preferably as the shape of the cross section orthogonal to the extending direction of the cells 14.

The size of the honeycomb structure portion 11 is such that the areas of the fluid inflow end surface 13a and the fluid outflow end surface 13b are from 50 to 10000 mm$^2$, respectively, and more preferably from 100 to 8000 mm$^2$, respectively.

The shape of each cell 14 in the cross section orthogonal to the extending direction of the cell 14 is preferably an ellipse, a quadrangle, a hexagon, an octagon, or a combination thereof, in addition to the circular shape as shown in FIG. 2. Such a shape can reduce the pressure loss when the exhaust gas is passed through the honeycomb structure portion 11, thereby efficiently decomposing the urea in the aqueous urea solution.

Each electrode portion 12 is formed in a band shape along the extending direction of the cells 14, but it may be formed in a wider width extending in the circumferential direction of the honeycomb structure portion 11. Further, in the cross section orthogonal to the extending direction of the cells 14, one electrode portion 12 is arranged on the opposite side of the other electrode portion 12 with the center of the honeycomb structure portion 11 interposed therebetween. Such a configuration can allow any bias of the current flowing in the honeycomb structure portion 11 to be suppressed when the voltage is applied between the pair of electrode portions 12, so that the bias of heat generation in the honeycomb structure portion 11 can be suppressed.

Further, the application of the voltage to the electrode portions 12 preferably heats the honeycomb structure portion 11 such that the temperature of the fluid inflow end surface 13a is 900° C. or less. The temperature of the honeycomb structure portion 11 can be controlled by directly providing a temperature measuring means on the honeycomb structure portion 11. Alternatively, it is also possible to estimate and control the temperature of the honeycomb structure portion 11 from a temperature of the carrier gas, a flow rate of the carrier gas, and the amount of the aqueous urea solution sprayed. Further, if operating conditions of the engine are mapped, the mapping may be replaced with the measurement of the temperature of the carrier gas and the flow rate of the carrier gas.

The material of the electrode portions 12 is preferably the same as the main component of the partition wall 15 of the honeycomb structure portion 11, although not particularly limited thereto.

The electrode portions 12 preferably have an electrical resistivity of from 0.0001 to 100 Ωcm, and more preferably from 0.001 to 50 Ωcm. The electrical resistivity of the electrode portions 12 in such a range can allow the pair of electrode portions 12 to effectively play the role of electrodes in an exhaust gas pipe through which an exhaust gas having elevated temperature flows. The electrical resistivity of the electrode portions 12 is preferably lower than that of the honeycomb structure portion 11.

The electrical resistivity of the electrode portions 12 is a value at 400° C. The electrical resistivity of the electrode portions 12 is a value measured by the four-terminal method.

The pair of electrode portions 12 may be provided with electrode terminal protruding portions 16 for connecting electrical wirings 18 from the outside. The material of the electrode terminal protruding portions 16 may be conductive ceramics or a metal. Further, the material of the electrode terminal protruding portions 16 is preferably the same as that of the electrode portions 12. Further, it is preferable that each electrode terminal protruding portion 16 and a connector 17 of the outer cylinder 2 are connected by the electric wiring 18.

The honeycomb structure portion 11 may be provided with a urea hydrolysis catalyst. By using the urea hydrolysis catalyst, ammonia can be efficiently produced from urea. Examples of the urea hydrolysis catalyst include titanium oxide and the like.

(1-2) Outer Cylinder 2

The outer cylinder 2 is preferably made of stainless steel or the like, although not particularly limited thereto.

In order fit the outer cylinder 2 to the honeycomb structure 1, the outer cylinder 2 preferably has the same type of shape as that of the honeycomb structure portion 11 in the cross section orthogonal to the extending direction of the cells 14. As use herein, "the same type of shape" means that when the shape of the outer cylinder 2 is square, the shape of the honeycomb structure portion 11 is also square, and when the shape of the outer cylinder 2 is rectangular, the shape of the honeycomb structure portion 11 is also rectangular. For example, when the shapes of the outer cylinder 2 and the honeycomb structure portion 11 are of the same type and their shapes are rectangular, it is not necessary for both to have the same ratio of the length to the width.

(1-3) Urea Sprayer 3

The type of the urea sprayer 3 is not particularly limited as long as it can spray the aqueous urea solution. It is preferably a solenoid type, an ultrasonic type, a piezoelectric actuator type, or an atomizer type. By using these, the aqueous urea solution can be easily sprayed in the form of mists. Further, among these, the use of the solenoid type, the ultrasonic type, or the piezoelectric actuator type can allow the aqueous urea solution to be sprayed in the form of mists without using air. This can eliminate necessity of heating the air used for spraying the aqueous urea solution, whereby an amount of energy to be heated can be reduced. Further, since the injection volume is reduced by not using the air used for spraying, a speed at which the aqueous urea solution in the form of mists passes through the honeycomb structure portion 11 can be reduced, resulting in a prolonged reaction time required for decomposition. The size (diameter) of each droplet of the aqueous urea solution sprayed from the urea sprayer 3 is preferably 0.3 mm or less. If the size of the droplet is larger than 0.3 mm, it may be difficult to vaporize it when heated in the honeycomb structure portion 11.

Here, the solenoid type urea sprayer 3 is a device that sprays the aqueous urea solution by vibrating the solenoid or moving a piston back and forth by an electric field using the solenoid. Further, the ultrasonic type urea sprayer 3 is a device that sprays the aqueous urea solution in the form of mists by ultrasonic vibration. Furthermore, the piezoelectric actuator type urea sprayer 3 is a device that sprays the aqueous urea solution in the form of mists by vibration of a piezoelectric element. Moreover, the atomizer type urea sprayer 3 is, for example, a device that sprays the solution by sucking the solution with a pipe and blowing off the solution sucked up to an opening at the tip of the pipe in the form of mists using air. The atomizer type urea sprayer 3 may be a device in which a plurality of small openings are formed at the tip of the nozzle and the solution is sprayed in the form of mists from the openings.

For the urea sprayer 3, the spray direction (the direction where the droplets eject) of the aqueous urea solution is preferably directed to the fluid inflow end surface 13a side of the honeycomb structure portion 11, in order to facilitate the spraying of the aqueous urea solution on the fluid inflow end surface 13a side of the honeycomb structure portion 11.

(1-4) Carrier Gas Introduction Cylinder 4

The carrier gas introduction cylinder 4 may be made of any material, including, but not particularly limited to, stainless steel and the like.

A shape of the carrier gas introduction cylinder 4 is not particularly limited. It is preferable that the cross-sectional shape is of the same type as that of the carrier gas introduction cylinder 2 formed in the outer cylinder 2. Such a shape can facilitate the connection of the carrier gas introduction cylinder 4 to the carrier gas introduction port 22.

Figure 3:
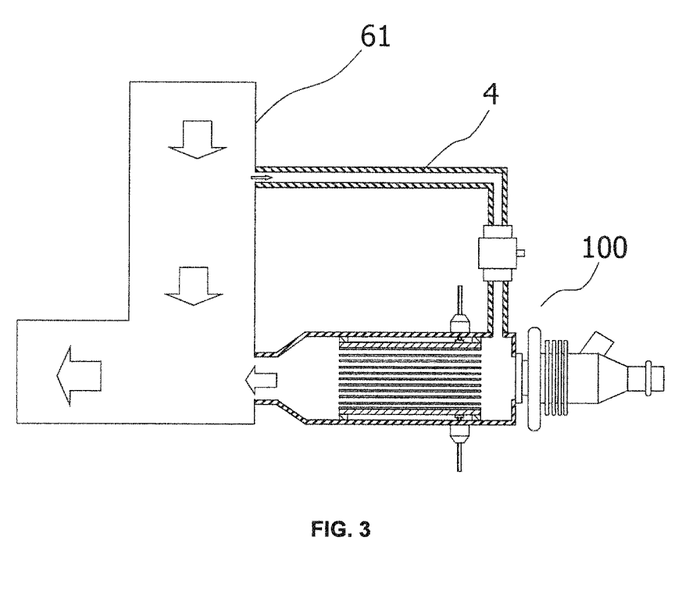
FIG. 3 is a schematic cross-sectional view for explaining a state where a reductant injecting device according to Embodiment 1 of the present invention is provided in an exhaust gas pipe.

When the exhaust gas is used as the carrier gas, as shown in FIG. 3, it is preferable that the carrier gas introduction cylinder 4 branches from an exhaust gas pipe 61 through which the exhaust gas flows. With such a configuration, a part of the exhaust gas flowing through the exhaust gas pipe 61 can be easily guided into the carrier gas introduction cylinder 4.

Figure 4:
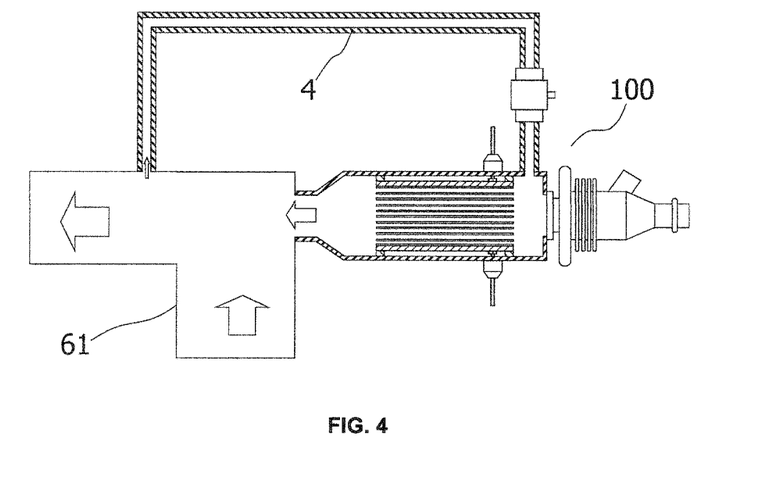
FIG. 4 is a schematic cross-sectional view for explaining another state where a reductant injecting device according to Embodiment 1 of the present invention is provided in an exhaust gas pipe.

Further, as shown in FIG. 4, the carrier gas introduction cylinder 4 preferably branches from the exhaust gas pipe 61 on the downstream side of the position where the ammonia generated in the reductant injecting device 100 is injected. With such a configuration, the carrier gas heated in the reductant injecting device 100 can be incorporated into the reductant injecting device 100 again, so that the effect of suppressing the urea deposits is improved. When the carrier gas is incorporated from the downstream side of the position where the ammonia generated in the reductant injecting device 100 is injected, the carrier gas may contain the ammonia, but the ammonia in the carrier gas directly passes through the reductant injecting device 100, so that the function of the reductant injecting device 100 is not affected.

(1-5) Carrier Gas Flow Rate Amplifier 5

The carrier gas flow rate amplifier 5 is not particularly limited, and various flow rate amplifiers such as a Coanda flow rate amplifier utilizing a Coanda effect and an ejector may be used. Such flow rate amplifiers are commercially available, and for example, Air Saver from TOHIN Co., Ltd., AIR-X from TOEI KAISHA, LTD., a transvector and a float transvector from KOGI CORPORATION may be used. The Coanda flow rate amplifier can amplify a flow rate of the carrier gas by 20 times or more an external air by introducing the external air from an external air introduction port 51, for example.

When the exhaust gas is used as the carrier gas, the carrier gas flow rate amplifier 5 preferably amplifies the exhaust gas flowing from the exhaust gas pipe into the carrier gas introduction cylinder 4 to a flow rate of 1.1 times or more. The upper limit of the amplification factor of the flow rate is not particularly limited, but it may preferably be 1.8 times, and more preferably 1.6 times. The amplification to such a flow rate can allow the carrier gas to be sufficiently introduced into the reductant injecting device 100.

Next, the method for producing the reductant injecting device 100 according to the present embodiment will be described in detail.

(2) Method for Producing Reductant Injecting Device 100

(2-1) Production of Honeycomb Structure 1

When the honeycomb structure 1 is made of ceramics, the method for producing the honeycomb structure 1 is preferably as follows:

The method for producing the honeycomb structure 1 includes: a production step of a honeycomb formed body; a production step of a honeycomb dried body; a production step of a honeycomb body with unfired electrodes, and a production step of a honeycomb structure.

(Production Step of Honeycomb Formed Body)

The step of a honeycomb formed body preferably include extruding a forming raw material to produce a honeycomb formed body. The forming raw material preferably contains a ceramic raw material and an organic binder. In addition to the ceramic raw material and the organic binder, the forming raw material may further contain a surfactant, a sintering aid, a pore former, water, and the like. The forming raw material can be obtained by mixing these raw materials.

The ceramic raw material in the forming raw material is "ceramics" or "a raw material that will form ceramics by firing". In any case, the ceramic raw material will form ceramics after firing. The ceramic raw material in the forming raw material preferably contains metallic silicon and silicon carbide particles (silicon carbide powder) as main components, or silicon carbide particles (silicon carbide powder) as a main component. This can provide the resulting honeycomb structure 1 with conductivity. The metallic silicon is also preferably metallic silicon particles (metallic silicon powder). The phrase "contains metallic silicon and silicon carbide particles as main components" means that the total mass of the metallic silicon and silicon carbide particles is 90% by mass or more of the whole (ceramic raw material). Examples of components other than the main components contained in the ceramic raw material include $SiO_2$, $SrCO_3$, $Al_2O_3$, $MgCO_3$, and cordierite.

When the silicon carbide is used as the main component of the ceramic raw material, the silicon carbide is sintered by firing. Further, when the metallic silicon and the silicon carbide particles are used as the main components of the ceramic raw material, the silicon carbide particles as an aggregate are bonded to each other with the metallic silicon as a binder by firing.

When the silicon carbide particles (silicon carbide powder) and the metal silicon particles (metal silicon powder) are used as the ceramic raw materials, the mass of the metal silicon particles is preferably from 10 to 40% by mass, based on the total mass of the silicon carbide particles and the metal silicon particles. The silicon carbide particles preferably have an average particle size of from 10 to 50 µm, and more preferably from 15 to 35 µm. The metallic silicon particles preferably have an average particle size of from 0.1 to 20 µm, and more preferably from 1 to 10 µm. The average particle size of each of the silicon carbide particles and the metal silicon particles is a value measured by a laser diffraction method.

Examples of the organic binder include methyl cellulose, glycerin, and hydroxypropyl methyl cellulose. As the organic binder, one type of organic binder may be used, or a plurality of types of organic binders may be used. An amount of the organic binder blended is preferably from 5 to 10 parts by mass, when the total mass of the ceramic raw materials is 100 parts by mass.

As the surfactant, ethylene glycol, dextrin and the like can be used. As the surfactant, one type of surfactant may be used, or a plurality of types of surfactants may be used. An amount of the surfactant blended is preferably from 0.1 to 2.0 parts by mass, when the total mass of the ceramic raw materials is 100 parts by mass.

The sintering aid that can be used includes $SiO_2$, $SrCO_3$, $Al_2O_3$, $MgCO_3$, cordierite and the like. As the sintering aid, one type of sintering aid may be used, or a plurality of types of sintering aids may be used. An amount of the sintering aid blended is preferably from 0.1 to 3 parts by mass, when the total mass of the ceramic raw materials is 100 parts by mass.

The pore former is not particularly limited as long as it forms pores after firing. Examples include graphite, starch, foamed resins, water-absorbent resins, and silica gel. As the pore former, one type of pore former may be used, or a plurality of types of pore formers may be used. An amount of the pore former blended is preferably from 0.5 to 10 parts by mass, when the total mass of the ceramic raw materials is 100 parts by mass.

An amount of water blended is preferably from 20 to 60 parts by mass, when the total mass of the ceramic raw materials is 100 parts by mass.

When the forming raw material is extruded, first, the forming raw material is kneaded to form a green body. The green body is then extruded to obtain a honeycomb formed product. The honeycomb formed body has a porous partition wall 15 that defines the cells 14 each extending from the fluid inflow end face 13*a* to the fluid outflow end face 13*b*. The partition wall 15 of the honeycomb formed body are a non-dried and non-fired partition wall 15.

(Production Step of Honeycomb Dried Body)

In the step of a honeycomb dried body, first, the resulting honeycomb formed body is dried to prepare a honeycomb dried body. The drying conditions are not particularly limited, and known conditions can be used. For example, it is preferable to dry the honeycomb formed body at a temperature of from 80 to 120° C. for 0.5 to 5 hours.

(Production Step of Honeycomb Body with Unfired Electrodes)

In the production step of a honeycomb body with unfired electrodes, first, an electrode forming slurry containing the ceramic raw material and water is applied to the side surface of the dried honeycomb body. The electrode forming slurry is then dried to form unfired electrodes to produce a honeycomb body with unfired electrodes.

For the honeycomb body with unfired electrodes, the dried honeycomb body is preferably provided with wide rectangular unfired electrodes each extending in a band shape in the extending direction of the cells 14, and also spreading in a circumferential direction. The circumferential direction refers to a direction along the side surface of the dried honeycomb body in the cross section orthogonal to the extending direction of the cells 14.

The electrode forming slurry used in the production step of the honeycomb body with unfired electrodes contains a ceramic raw material and water. The electrode forming slurry may contain a surfactant, a pore former, water, and the like.

As the ceramic raw material, it is preferable to use the ceramic raw material used when producing the honeycomb formed body. For example, when the main components of the ceramic raw material used when producing the honeycomb formed body are the silicon carbide particles and the metallic silicon, the silicon carbide particles and the metallic silicon may also be used as the ceramic raw materials of the electrode forming slurry.

A method of applying the electrode forming slurry to the side surface of the dried honeycomb body is not particularly limited. The electrode forming slurry may be applied, for example, by using a brush or by using a printing technique.

The electrode forming slurry preferably has a viscosity of 500 Pa·s or less, and more preferably from 10 to 200 Pa·s, at 20° C. The viscosity of the electrode forming slurry of 500 Pa·s or less can lead to easy application of the electrode forming slurry to the side surface of the dried honeycomb body.

After applying the electrode forming slurry to the dried honeycomb body, the electrode forming slurry can be dried to obtain unfired electrodes (the honeycomb body with unfired electrodes). The drying temperature is preferably from 80 to 120° C. The drying time is preferably from 0.1 to 5 hours.

(Production Step of Honeycomb Structure)

In the production step of a honeycomb structure, the honeycomb body with the unfired electrodes is fired to produce the honeycomb structure 1.

The firing conditions may be appropriately determined according to the types of the ceramic raw material used in the production of the honeycomb formed body and the ceramic raw material used in the electrode forming slurry.

Further, calcination is preferably carried out after drying the honeycomb molded body with the unfired electrodes and before the firing, in order to remove the binder and the like. The calcination is preferably carried out in an air atmosphere at a temperature of from 400 to 500° C. for 0.5 to 20 hours.

When the urea hydrolysis catalyst 40 is supported on the honeycomb structure 1, for example, the honeycomb structure 1 may be immersed in a container in which a slurry of the urea hydrolysis catalyst 40 is stored. By adjusting a viscosity of the slurry of the urea hydrolysis catalyst 40, a particle size of the urea hydrolysis catalyst 40 contained, and the like, the catalyst can be supported not only on the surfaces of the partition wall 15 but also in the pores of the partition wall 15, as well as an amount of catalyst to be supported can also be adjusted. Further, the amount of catalyst to be supported can also be adjusted by sucking the slurry a plurality of times.

(2-2) Production of Reductant Injecting Device 100

The reductant injecting device 100 can be produced by inserting the honeycomb structure 1 into the outer cylinder 2, fixing the honeycomb structure 1 into the outer cylinder 2 via the insulation holding portion 23, and arranging the urea sprayer 3 at one end (inlet side end portion) of the outer cylinder 2, and then connecting each of the connectors 17 of the outer cylinder 2 to each of the electrode terminal protruding portions 16 arranged on the pair of electrode portions 12 via the electric wiring 18, and then connecting the carrier gas introduction cylinder 4 to the carrier gas introduction port 22 of the outer cylinder 2, and providing the carrier gas introduction cylinder 4 with the carrier gas flow rate amplifier 5.

Next, a method of using the reductant injecting device 100 of the present embodiment will be described in detail.

(3) Method of Using Reductant Injecting Device 100

The reductant injecting device 100 according to the present embodiment feeds the aqueous urea solution as a raw material, thereby decomposing the urea in the aqueous urea solution to generate ammonia, and injecting the generated ammonia to the outside. More specifically, the current is conducted through the honeycomb structure portion 11 to increase the temperature (heating), the aqueous urea solution is fed to the urea sprayer 3, and the aqueous urea solution is sprayed from the urea sprayer 3 toward the fluid inflow end face 13*a* side of the honeycomb structure portion 11. In this case, by introducing the carrier gas having an amplified flow rate by the carrier gas flow rate amplifier 5 to the fluid inflow end surface 13*a* side of the honeycomb structure portion 11 via the carrier gas introduction port 22, the flow of the aqueous urea solution is facilitated to prevent the aqueous urea solution from being stagnated in the honeycomb structure portion 11. The aqueous urea solution sprayed from the urea sprayer 3 is heated by the honeycomb structure portion 11 and evaporated. Due to the increased pressure in the region between the honeycomb structure portion 11 and the urea sprayer 3 caused by the evaporation of the aqueous urea solution, and due to the flow of the carrier gas, the aqueous urea solution sprayed from the urea sprayer 3 enters the cells 14 of the honeycomb structure portion 11 from the fluid inflow end face 13a. The urea in the aqueous urea solution fed into the cells 14 is decomposed by the temperature of the heated honeycomb structure portion 11 to generate the ammonia.

The flow rate of the carrier gas after being amplified by the carrier gas flow rate amplifier 5 may preferably be from 1 to 200 L/min, and more preferably from 2 to 50 L/min, although not particularly limited thereto. Such a flow rate can lead to efficient introduction of the carrier gas into the honeycomb structure portion 11.

The amount of the aqueous urea solution fed is not particularly limited, and it is preferably be from 1.0 to 2.0 in an equivalent ratio to the amount of nitrogen oxides (NOx) contained in the exhaust gas. If the equivalent ratio is less than 1.0, the amount of nitrogen oxides discharged without purification may increase. However, if the SCR catalyst is provided with a NOx storage function, there may be a period during which the equivalent ratio is less than 1.0. If the equivalent ratio is more than 2.0, there is a risk that the exhaust gas is likely to be discharged with the ammonia mixed in the exhaust gas.

The aqueous urea solution is preferably an aqueous solution containing from 10 to 40% by mass of urea, although not particularly limited thereto. If the urea content is less than 10% by mass, it is necessary to spray a large amount of the aqueous urea solution in order to reduce NOx, and an amount of electric power required for conducting the current to heat the honeycomb structure portion 11 may increase. If the urea content is more than 40% by mass, there is a concern that the urea will solidify in cold regions. Preferable examples of the aqueous urea solution include AdBlue (an aqueous solution containing 32.5% by mass of urea; a registered trademark of Verband der Automobilindustrie (VDA)), which is widely distributed in the market.

The heating temperature of the honeycomb structure portion 11 is preferably 160° C. or higher, and more preferably from 160 to 600° C., and even more preferably from 250 to 400° C. The heating temperature of 160° C. or higher can lead to easy and efficient decomposition of the urea. The heating temperature of 600° C. or lower can allow the ammonia to be burned out and prevent the ammonia from being not fed to the exhaust gas pipe. Further, it is preferable that the heating temperature of the honeycomb structure portion 11 is 360° C. or higher because sulfur compounds such as ammonium hydrogen sulfate and ammonium sulfate precipitated on the reductant injecting device 100 can be removed.

The maximum voltage applied to the honeycomb structure portion 11 is preferably from 12 to 200 V, and more preferably from 12 to 100 V, and even more preferably from 12 to 48 V. The maximum voltage of 12 V or more can allow the temperature of the honeycomb structure portion 11 to be easily increased. The maximum voltage of 200 V or less can prevent a device for increasing the voltage from becoming expensive.

Embodiment 2

Figure 5:
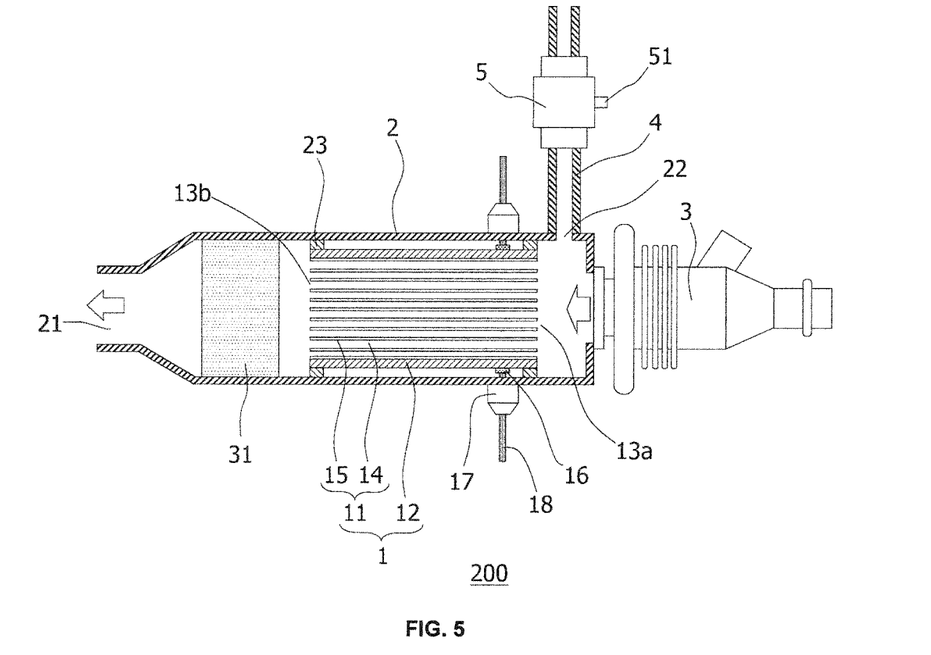
FIG. 5 is a schematic cross-sectional view showing a reductant injecting device according to Embodiment 2 of the present invention.

FIG. 5 is a schematic cross-sectional view showing a reductant injecting device according to Embodiment 2 of the present invention (a schematic cross-sectional view parallel to an extending direction of cells of a honeycomb structure portion).

As shown in FIG. 5, a reductant injecting device 200 according to the present embodiment has a different configuration from that of the reductant injecting device 100 according to Embodiment 1 in that the former further includes a urea hydrolysis catalyst body 31 on the fluid outflow end face 13b side of the honeycomb structure portion 11, spaced apart from the fluid outflow end face 13b. Other configurations of the reductant injecting device 200 according to the present embodiment are the same as those of the reductant injecting device 100 according to Embodiment 1. Therefore, descriptions of the other configurations will be omitted, and only differences will be described in detail.

In the reductant injecting device 200 according to the present embodiment, the urea hydrolysis catalyst body 31 spaced apart from the fluid outflow end face 13b is provided on the fluid outflow end face 13b side of the honeycomb structure portion 11. With such a configuration, unreacted urea in the honeycomb structure portion 11 can be decomposed into ammonia by the urea hydrolysis catalyst body 31, so that the efficiency of ammonia production is improved.

The urea hydrolysis catalyst body 31 is preferably a honeycomb structure on which a urea hydrolysis catalyst is supported. A support (honeycomb structure) used for the urea hydrolysis catalyst body 31 may have the same structure and material as those of the honeycomb structure 1 provided upstream. The honeycomb structure used for the urea hydrolysis catalyst body 31 may not have a pair of electrode portions 12, but it may be configured to be heated by current conduction as in the honeycomb structure 1 provided upstream.

The urea hydrolysis catalyst body 31 may support the urea hydrolysis catalyst on the honeycomb structure after producing the honeycomb structure (support) as in the honeycomb structure 1 provided upstream. The method for supporting the urea hydrolysis catalyst on the honeycomb structure is as described above.

Embodiment 3

Figure 6:
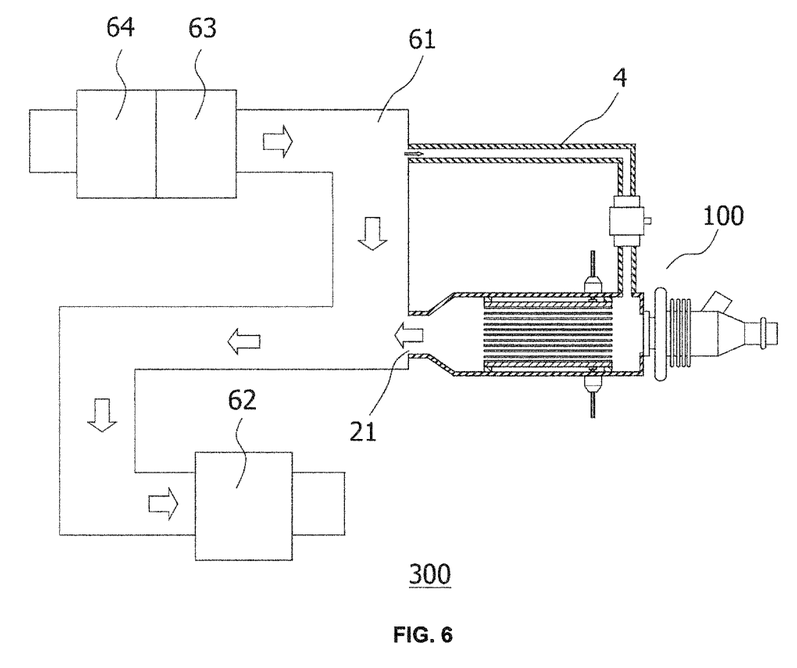
FIG. 6 is a schematic cross-sectional view showing an exhaust gas processing device according to Embodiment 3 of the present invention.
Figure 7:
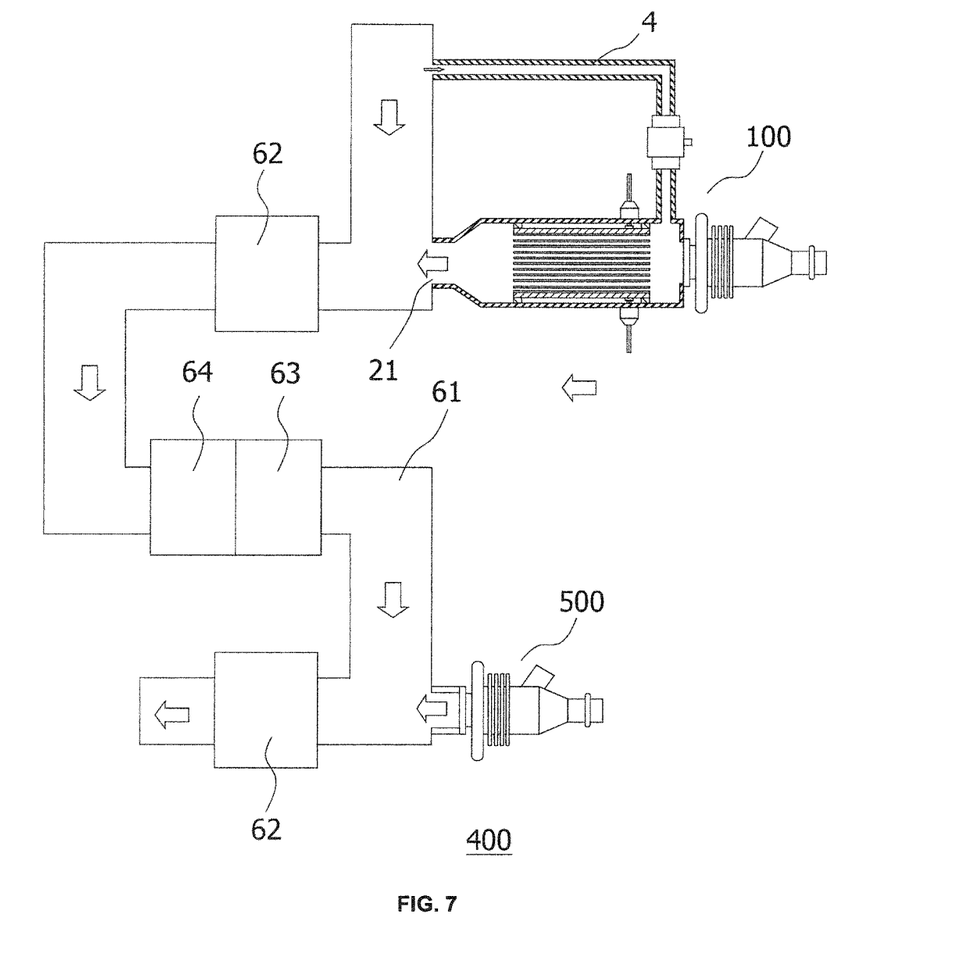
FIG. 7 is a schematic cross-sectional view showing an exhaust gas processing device according to Embodiment 4 of the present invention.

FIGS. 6 and 7 are schematic cross-sectional views showing exhaust gas processing devices according to Embodiment 3 of the present invention.

As shown in FIGS. 6 and 7, each of the exhaust gas processing devices 300, 400 according to the present embodiment include: an exhaust gas pipe 61 through which the exhaust gas flows; the reductant injecting device 100 for injecting the ammonia into the exhaust gas pipe 61; and an SCR catalyst 62 arranged at the exhaust gas pipe 61 on a downstream side of a position where the ammonia is injected.

The exhaust gas pipe 61 is a pipe through which an exhaust gas (an exhaust gas containing NOx) discharged from various engines and the like is passed, and in which the exhaust gas and ammonia are mixed. The size of the exhaust gas pipe 61 is not particularly limited, and it can be appropriately determined depending on exhaust systems such as engines to which the exhaust gas processing devices 300, 400 according the present embodiment are attached. The exhaust gas pipe 61 has a non-limiting length in the gas flow direction, but it preferably has a length in which a distance between the reductant injecting device 100 and the SCR catalyst 62 can be set to an appropriate distance.

A material of the exhaust gas pipe 61 is not particularly limited, but a material that is difficult to be corroded by the exhaust gas is preferable. Examples of the material of the exhaust gas pipe 61 include stainless steel and the like.

When the exhaust gas is used as the carrier gas to be introduced into the reductant injecting device 100, the carrier gas introduction cylinder 4 is connected so as to be branch from the exhaust gas pipe 61 as shown in FIGS. 6 and 7. A position of the carrier gas introduction cylinder 4 branching from the exhaust gas pipe 61 may be upstream of the reductant injecting device 100, or downstream of the reductant injecting device 100. By arranging the carrier gas introduction cylinder 4 downstream of the reductant injecting device 100, the carrier gas heated in the reductant injecting device 100 can be incorporated into the reductant injecting device 100 again, so that the effect of suppressing the urea deposits can be improved.

Further, when the carrier gas other than the exhaust gas (for example, intake gas) is used, the carrier gas introduction cylinder 4 is connected to a feed source for the carrier gas.

In the reductant injecting device 100, an injection port 21 is attached to the exhaust gas pipe 61, and injects the ammonia into the exhaust gas pipe 61. By injecting the ammonia into the exhaust gas pipe 61 from the reductant injecting device 100, a mixed gas of the ammonia and the exhaust gas is generated in the exhaust gas pipe 61.

As shown in FIG. 6, one reductant injecting device 100 may be attached to the exhaust gas pipe 61. Further, as shown in FIG. 7, two reductant injecting devices may be attached to the exhaust gas pipe 61. In this case, the reductant injecting device on the downstream side may be the reductant injecting device 100 or a conventional reductant injecting device 500 (for example, the urea sprayer 3) that sprays the reductant (urea water) without heating. In a preferred embodiment, the reductant injecting device on the downstream side is the conventional reductant injecting device 500 that sprays the reductant (urea water) without heating. This is because when the amount of NOx in the exhaust gas is lower (when the temperature of the exhaust gas is lower), most of the NOx is purified by the reductant injecting device 100 and the SCR catalyst 62 on the upstream side, and when the amount of NOx in the exhaust gas is higher (when the temperature of the exhaust gas is higher), the urea water sprayed from the conventional reductant injecting device 500 is decomposed into ammonia by the temperature of the exhaust gas. Further, although not shown, three or more reductant injecting devices 100 may be attached to the exhaust gas pipe 61, as needed.

The SCR catalyst 62 in the form of a catalyst body (the honeycomb structure on which the SCR catalyst 62 is supported) is arranged at the exhaust gas pipe 61 on the downstream of the position where the ammonia is injected. Therefore, as shown in FIG. 6, when one reductant injecting device 100 is attached to the exhaust gas pipe 61, the SCR catalyst 62 is arranged at the exhaust gas pipe 61 on the downstream side of the position where the reductant injecting device 100 is attached. Further, as shown in FIG. 7, when two reductant injecting devices 100 are attached to the exhaust gas pipe 61, the SCR catalysts 62 are arranged at the exhaust gas pipe 61 on the downstream side of the positions where the reductant injecting device 100 and the conventional reductant injecting device 500 are attached, respectively.

Examples of the SCR catalyst 62 include vanadium-based catalysts and zeolite-based catalysts.

When the SCR catalyst 62 is used as a catalyst body supported on the honeycomb structure, it is preferable to contain the catalyst body in a container and attach the container to the exhaust gas pipe 61 on the downstream side.

The honeycomb structure that supports the SCR catalyst 62 is not particularly limited, and honeycomb structures known in the art can be used.

It is preferable that a filter for collecting particulate matters in the exhaust gas is arranged on the upstream side of the exhaust gas pipe 61. Examples of the filter for collecting particulate matters include a ceramic DPF (diesel particulate filter) 63 having a honeycomb shape. Further, it is preferable that an oxidation catalyst 64 for removing hydrocarbons and carbon monoxide in the exhaust gas is arranged on the upstream side of the exhaust gas pipe 61. The oxidation catalyst 64 is preferably in a state of being supported on a honeycomb structure made of ceramics (oxidation catalyst). Preferable examples of the oxidation catalyst 64 that can be used include precious metals such as platinum (Pt), palladium (Pd), and rhodium (Rh).

When one reductant injecting device 100 is attached to the exhaust gas pipe 61, the DPF 63 and the oxidation catalyst 64 are arranged at the exhaust gas pipe 61 on the upstream side of the position where the ammonia is injected by the reductant injecting device 100, as shown in FIG. 6. Further, when two reductant injecting devices 100 are attached to the exhaust gas pipe 61, the DPF 63 and the oxidation catalyst 64 are arranged at the exhaust gas pipe 61 on the upstream side of the position where the ammonia is injected by the conventional reductant injecting device 500, and on the downstream side of the SCR catalyst 62 on the downstream side of the position where the reductant injecting device 100 is attached, as shown in FIG. 7.

It is preferable to dispose an ammonia removing catalyst (oxidation catalyst) for removing ammonia on the downstream side of the SCR catalyst 62. Such a configuration can prevent ammonia from being discharged to the outside when excess ammonia that has not been used for removing NOx in the exhaust gas flows to the downstream side. Preferable examples of the oxidation catalyst arranged on the downstream side of the SCR catalyst 62 include precious metals such as platinum (Pt), palladium (Pd), and rhodium (Rh).

In the above description, the use of the reductant injecting device 100 of Embodiment 1 has been described. However, the reductant injecting device 200 of Embodiment 2 may be used.

Embodiment 4

In a method for processing an exhaust gas according to Embodiment 4 of the present invention, the ammonia generated in the reductant injecting device 100, 200 according to Embodiment 1 or 2 is injected into the exhaust gas, and the exhaust gas mixed with the ammonia is reduced with the SCR catalyst. Thus, the NOx in the exhaust gas can be removed. The method for processing the exhaust gas can be easily carried out by using the exhaust gas processing device 300, 400 according to Embodiment 3.

The reductant injecting device 100, 200 can stably feed the carrier gas having a flow rate amplified by the carrier gas flow rate amplifier 5 to the fluid inflow end face 13a side of the honeycomb structure portion 11, together with the aqueous urea solution sprayed from the urea sprayer 3. This can facilitate sufficient flow of the gas in the honeycomb structure portion 11, thereby preventing the urea from remaining in the honeycomb structure portion 11, so that the generation limit of urea deposits can be increased. Further, the ammonia decomposed by heating can be discharged to the outside by the carrier gas, so that the reactiveness is improved.

A temperature and flow rate of the carrier gas and a power supplied to the honeycomb structure 1 are preferably adjusted such that a temperature of the fluid inflow end face 13a of the honeycomb structure portion 11 is 150° C. or higher, and preferably 250° C. or higher. In order to perform such temperature control, for example, the temperature of the carrier gas is preferably 180° C. or higher, and the flow rate is preferably 10 L/min or more. The power supplied to the honeycomb structure 1 is preferably from 150 to 500 W.

An amount of the ammonia injected from the reductant injecting device 100, 200 is preferably from 1.0 to 2.0 in an equivalent ratio to the amount of nitrogen oxide contained in the exhaust gas. If the equivalent ratio is less than 1.0, the amount of nitrogen oxides discharged without purification may increase. If the equivalent ratio is more than 2.0, there is a risk that the exhaust gas is likely to be discharged with the ammonia mixed in the exhaust gas.

It is preferable that the sprayed amount of the aqueous urea solution and the temperature (power supply) of the honeycomb structure portion 11 are controlled by an electronic control unit. Further, the temperature may be calculated from a resistance value of the honeycomb structure portion 11, and the temperature of the honeycomb structure portion 11 may be controlled such that the calculated temperature is a desired temperature.

EXAMPLES

Hereinafter, the present invention will be described in more detail with reference to Examples. However, the present invention is not limited to these Examples.

Example 1

The reductant injecting device 100 as shown in FIG. 1 was produced according to the following procedure:

First, silicon carbide (SiC) powder and metallic silicon (Si) powder were mixed at a mass ratio of 70:30 to prepare a ceramic raw material. To the ceramic raw material were added hydroxypropyl methyl cellulose as a binder and a water-absorbing resin as a pore former, and water was further added to prepare a forming raw material. The forming raw material was kneaded with a vacuum green body kneader to prepare a green body. The amount of the binder added was 7 parts by mass with respect to 100 parts by mass of the ceramic raw material. The amount of the pore former added was 3 parts by mass with respect to 100 parts by mass of the ceramic raw material. The amount of water added was 42 parts by mass with respect to 100 parts by mass of the ceramic raw material. The average particle size of the silicon carbide powder was 20 μm, and the average particle size of the metallic silicon powder was 6 μm. The average particle size of the pore former was 20 μm. The average particle size of each of silicon carbide, metallic silicon, and the pore former is a value measured by a laser diffraction method.

The resulting green body was molded using an extrusion molding machine to obtain a honeycomb formed body having a square pillar shape (a pillar shape having a square cross section orthogonal to the extending direction of the cells). The obtained honeycomb formed body was dried by high-frequency dielectric heating, and then dried at 120° C. for 2 hours using a hot air dryer, and both end faces were cut by a predetermined amount.

Subsequently, silicon carbide (SiC) powder and metallic silicon (Si) powder were mixed at a mass ratio of 60:40 to prepare an electrode forming ceramic raw material. To the electrode forming ceramic raw material were added hydroxypropyl methyl cellulose as a binder, glycerin as a moisturizing agent, and a surfactant as a dispersant, and water was further added and mixed. The mixture was then kneaded to obtain an electrode forming slurry.

Subsequently, the electrode forming slurry was applied in a strip shape on two parallel surfaces on the side surface of the dried honeycomb formed body (honeycomb dried body). The electrode forming slurry was applied in a strip shape to one side surface of the "side surfaces having four flat surfaces (four side surfaces)" of the honeycomb dried body, and to one side surface parallel to the "applied side surface". The shape (outer peripheral shape) of the electrode forming slurry applied to the side surface of the dried honeycomb body was rectangular.

The electrode forming slurry applied to the honeycomb dried body was then dried to obtain a honeycomb body with unfired electrodes. The drying condition was 70° C.

Two electrode terminal protruding portions 16 were separately prepared using the same materials as those of the electrode forming slurry.

The two electrode terminal protruding portions 16 were attached to two electrode portions of the honeycomb body with the unfired electrodes, respectively. The honeycomb body with the unfired electrodes was degreased, fired, and further oxidized to obtain the honeycomb structure 1. The degreasing conditions was 550° C. for 3 hours. The firing conditions were 1450° C. for 2 hours in an argon atmosphere. The oxidation conditions were 1300° C. for 1 hour.

The thickness of the partition wall 15 of the honeycomb structure 1 obtained as described above was 0.152 mm, and the cell pitch was 1.11 mm. The surface area of the honeycomb structure portion 11 per unit volume was 31.1 $cm^2/cm^3$. The honeycomb structure 1 had a pillar shape having square end faces, and one side of the end face was 30 mm. Further, the length of the cells 14 of the honeycomb structure 1 in the extending direction was 25 mm. The electrical resistivity of the electrode portions was 0.1 Ωcm, and the electrical resistivity of the honeycomb structure portion 11 was 1.4 Ωcm. No plugged portion was formed on the honeycomb structure 1.

The outer cylinder 2 was then prepared from stainless steel. One connector 17 for electrical wiring was attached to the outer circumference of the outer cylinder 2. The honeycomb structure 1 was inserted into the outer cylinder 2 and fixed by the insulation holding portion 23. One of the electrode terminal protruding portions 16 of the honeycomb structure 1 was connected to the connector 17 of the outer cylinder 2 via the electric wiring 18. Further, the other electrode terminal protruding portion 16 was brought into contact with the outer cylinder 2. Further, the solenoid type urea sprayer 3 was disposed in the inlet side end portion of the outer cylinder 2, and the stainless steel carrier gas introduction cylinder 4 was connected to the carrier gas introduction port 22 of the outer cylinder 2, and the carrier gas introduction cylinder 4 was provided with the air saver from TOHIN as the carrier gas flow rate amplifier 5 to obtain the reductant injecting device 100.

Comparative Example 1

A reductant injecting device was obtained in the same procedure as that of Example 1, with the exception that the carrier gas flow rate amplifier 5 was not provided.

The reductant injecting device obtained in the above Example was provided at a predetermined position in the exhaust gas pipe as shown in FIG. 3, and a test was conducted by changing the amplification factor of the flow rate of the exhaust gas by the carrier gas flow rate amplifier 5, and continuously spraying a constant amount of an aqueous urea solution (AdBlue) for 30 minutes to determine a maximum spray rate (g/min) of the aqueous urea solution when no urea deposit was generated on the fluid inflow end face side of the honeycomb structure. Also, for the reductant injecting device obtained in the above Comparative Example, the maximum spray amount (g/min) of the aqueous urea solution when no urea deposit was generated on the fluid inflow end face side of the honeycomb structure portion was determined in the same procedure as described above. The results are shown in Table 1. The presence or absence of urea deposit was visually evaluated.

TABLE 1

|  | Amplification Factor of Exhaust Gas Flow Rate (times) | Amplified Flow Rate of Exhaust Gas (L/min) | Maximum Spray Amount of Aqueous Urea Solution (g/min) |
|---|---|---|---|
| Comparative Example 1 | 1.00 | 0 | 1.0 |
| Example 1 | 1.05 | 1 | 1.5 |
|  | 1.10 | 10 | 4.2 |
|  | 1.20 | 30 | 4.8 |
|  | 1.30 | 50 | 3.7 |
|  | 1.60 | 80 | 3.0 |
|  | 1.80 | 100 | 2.0 |

As shown in Table 1, it was found that the reductant injecting device provided with the carrier gas flow rate amplifier 5 according Example had a higher maximum spray amount of the aqueous urea solution when no urea deposit was generated on the fluid inflow end face side of the honeycomb structure portion, than that of the reductant spray device which was not provided with the carrier gas flow rate amplifier 5 according to Comparative Example, and the former could stably suppress the urea deposits. In particular, when the amplification factor of the exhaust gas flow rate by the carrier gas flow rate amplifier 5 was set to 1.10 times or more, the maximum spray amount of the aqueous urea solution when no urea deposit was generated on the fluid inflow end face side of the honeycomb structure was higher.

As can be seen from the above results, according to the present invention, it is possible to provide a reductant injecting device which can stably suppress urea deposits. Further, according to the present invention, it is possible to provide an exhaust gas processing device and an exhaust gas processing method, which can stably inject a required amount of ammonia from the reductant injecting device to purify NOx.

INDUSTRIAL APPLICABILITY

The reductant injecting device, the exhaust gas processing device, and the method for processing the exhaust gas according to the present invention can be suitably used for purifying NOx in the exhaust gases discharged from various engines and the like.

DESCRIPTION OF REFERENCE NUMERALS 1 honeycomb structure
2 outer cylinder
3 urea sprayer
4 carrier gas introduction cylinder
5 carrier gas flow rate amplifier
11 honeycomb structure portion
12 electrode portion
13a fluid inflow end face
13b fluid outflow end face
14 cell
15 partition wall
16 electrode terminal protruding portion
17 connector
18 electrical wiring
21 injection port
22 carrier gas introduction port
23 insulation holding portion
31 urea hydrolysis catalyst body
51 external air introduction port
61 exhaust gas pipe
62 SCR catalyst
63 DPF
64 oxidation catalyst
100, 200 reductant injecting device
300, 400 exhaust gas processing device
500 conventional reductant injecting device

The invention claimed is:

1. A reductant injecting device, comprising:
a honeycomb structure comprising:
a pillar shaped honeycomb structure portion having a partition wall that defines a plurality of cells each extending from a fluid inflow end face to a fluid outflow end face; and
at least one pair of electrode portions being configured to heat the honeycomb structure portion by conducting a current, the pair of the electrode portions being arranged on a side surface of the honeycomb structure portion, the honeycomb structure being configured to be able to decompose urea in an aqueous urea solution in the honeycomb structure portion heated by conducting the current to generate ammonia;
an outer cylinder being configured to house the honeycomb structure, the outer cylinder having a carrier gas introduction port being configured to introduce a carrier gas, on the fluid inflow end face side;
a urea sprayer being configured to spray the aqueous urea solution to the fluid inflow end face side of the honeycomb structure portion, the urea sprayer being arranged at one end of the outer cylinder;
a carrier gas introduction cylinder provided at the carrier gas introduction port of the outer cylinder; and
a carrier gas flow rate amplifier being configured to amplify a flow rate of the carrier gas to 1.1 times or more, the carrier gas flow rate amplifier being provided in the carrier gas introduction cylinder.

2. The reductant injecting device according to claim 1, wherein the carrier gas is an exhaust gas, and the carrier gas introduction cylinder branches from an exhaust gas pipe through which the exhaust gas flows.

3. The reductant injecting device according to claim 2, wherein the carrier gas introduction cylinder branches from the exhaust gas pipe on a downstream side of a position where ammonia is sprayed.

4. The reductant injecting device according to claim 1, further comprising a urea hydrolysis catalyst body arranged on the fluid outflow end face side of the honeycomb structure portion, the urea hydrolysis catalyst body being spaced apart from the fluid outflow end face.

5. The reductant injecting device according to claim 1, wherein the honeycomb structure portion has an electrical resistivity of from 0.01 to 500 Ωcm.

6. The reductant injecting device according to claim 1, wherein the honeycomb structure portion contains a silicon-silicon carbide composite material or silicon carbide as a main component.

7. The reductant injecting device according to claim 1, wherein the honeycomb structure portion has a surface area per unit volume of from 5 $cm^2/cm^3$ or more.

8. An exhaust gas processing device, comprising:
an exhaust gas pipe through which an exhaust gas flows;
the reductant injecting device according to claim 1, being configured to inject ammonia into the exhaust gas pipe; and
an SCR catalyst arranged at the exhaust gas pipe on a downstream side of a position where the ammonia is injected.

9. A method for processing an exhaust gas, the method comprising injecting generated ammonia into the exhaust gas by the reductant injecting device according to claim 1, and reducing the exhaust gas mixed with the ammonia by an SCR catalyst.

* * * * *